(12) United States Patent
Bliss

(10) Patent No.: US 12,179,228 B2
(45) Date of Patent: Dec. 31, 2024

(54) DISPENSING SYSTEM HAVING A MECHANICAL AMPLIFIER

(71) Applicant: NORDSON CORPORATION, Westlake, OH (US)

(72) Inventor: Craig F. Bliss, Taunton, MA (US)

(73) Assignee: Nordson Corporation, Westlake, OH (US)

( * ) Notice: Subject to any disclaimer, the term of this patent is extended or adjusted under 35 U.S.C. 154(b) by 292 days.

(21) Appl. No.: 17/610,186

(22) PCT Filed: May 11, 2020

(86) PCT No.: PCT/US2020/032331
§ 371 (c)(1),
(2) Date: Nov. 10, 2021

(87) PCT Pub. No.: WO2020/231916
PCT Pub. Date: Nov. 19, 2020

(65) Prior Publication Data
US 2022/0314267 A1 Oct. 6, 2022

Related U.S. Application Data

(60) Provisional application No. 62/846,689, filed on May 12, 2019.

(51) Int. Cl.
*B05C 5/02* (2006.01)
*B05B 1/08* (2006.01)
(Continued)

(52) U.S. Cl.
CPC .......... *B05C 11/1034* (2013.01); *B05B 1/083* (2013.01); *B05B 12/082* (2013.01);
(Continued)

(58) Field of Classification Search
CPC ... B05C 11/1034; B05C 5/0225; B05B 1/083; B05B 12/082; B05B 15/00; H02N 2/043; H02N 2/02; H02N 2/04
See application file for complete search history.

(56) References Cited

U.S. PATENT DOCUMENTS 6,494,382 B1   12/2002  Stier
7,225,790 B2 *  6/2007  Bartunek ............. F02M 65/005
                                                     123/294
(Continued)

FOREIGN PATENT DOCUMENTS

CN     107635675 A    1/2018
JP     2002-539370 A  11/2002
(Continued)

OTHER PUBLICATIONS

IPEA/409—International Preliminary Report on Patentability Mailed on Nov. 25, 2021 for WO Application No. PCT/US20/032331.
(Continued)

*Primary Examiner* — Frederick C Nicolas
(74) *Attorney, Agent, or Firm* — BakerHostetler

(57) ABSTRACT

A dispensing system includes a piezoelectric stack having a distal end and being configured to expand upon application of a voltage such that the distal end is moved by a first length. The system further includes an amplifier with a primary surface to contact the distal end of the stack and a secondary surface, a base configured to contact the secondary surface, and a valve assembly with an outlet orifice and valve element. The valve element is configured to move in first and second directions and is coupled with the amplifier. When the distal end is moved by a first length, a portion of the amplifier is moved by a second length that is greater than the first length, and the valve element is moved in a first direction by the second length.

23 Claims, 10 Drawing Sheets

(51) Int. Cl.
  *B05B 12/08* (2006.01)
  *B05B 15/00* (2018.01)
  *B05C 11/10* (2006.01)
  *H02N 2/02* (2006.01)
  *H02N 2/04* (2006.01)

(52) U.S. Cl.
  CPC ............ *B05B 15/00* (2013.01); *B05C 5/0225* (2013.01); *H02N 2/02* (2013.01); *H02N 2/04* (2013.01); *H02N 2/043* (2013.01)

(56) References Cited

U.S. PATENT DOCUMENTS

| | | | | |
|---|---|---|---|---|
| 10,215,300 | B2 * | 2/2019 | Reith | ............ B64G 1/402 |
| 2003/0160202 | A1 | 8/2003 | Boecking | |
| 2014/0124600 | A1 | 5/2014 | Ciardella et al. | |
| 2015/0059877 | A1 | 3/2015 | Vu | |
| 2015/0369373 | A1 * | 12/2015 | Reith | ............ B64G 1/402 |
| | | | | 251/129.01 |
| 2016/0339467 | A1 * | 11/2016 | Conner | ............ H10N 30/802 |
| 2016/0339470 | A1 * | 11/2016 | MacIndoe | ............ B05C 5/0225 |
| 2016/0339471 | A1 * | 11/2016 | Bittner | ............ B05B 1/3046 |
| 2021/0245188 | A1 * | 8/2021 | Felber | ............ H05K 13/0469 |

FOREIGN PATENT DOCUMENTS

| | | |
|---|---|---|
| JP | 2008-188496 A | 8/2008 |
| JP | 2010-223196 A | 10/2010 |
| WO | 2014/201032 A1 | 12/2014 |

OTHER PUBLICATIONS

ISA/220—Notification of Transmittal or Search Report and Written Opinion of the ISA, or the Declaration Mailed on Sep. 15, 2020 for WO Application No. PCT/US20/032331.

* cited by examiner

DISPENSING SYSTEM HAVING A MECHANICAL AMPLIFIER

CROSS-REFERENCE TO RELATED APPLICATIONS

This application is a National Stage Application of International Patent App. No. PCT/US2020/032331, filed May 11, 2020, which claims the benefit of U.S. Provisional Patent App. No. 62/846,689, filed May 12, 2019, the entire disclosures of both of which are hereby incorporated by reference as if set forth in their entirety herein.

TECHNICAL FIELD

The present invention generally relates to dispensers for depositing droplets of fluid onto a substrate, and more specifically, to dispensers that are actuated by one or more piezoelectric elements.

BACKGROUND

Dispensers are often used to apply minute amounts of materials, e.g., viscous fluid with a viscosity exceeding fifty centipoise, onto substrates. For example, viscous materials can include general purpose adhesives, ultraviolet curable adhesives, solder paste, solder flux, solder mask, thermal grease, lid sealant, oil, encapsulants, potting compounds, epoxies, die attach fluids, silicones, RTV, and cyanoacrylates.

Dispensers generally may have pneumatic or electric actuators for moving a shaft or tappet repeatedly toward a seat while jetting a droplet of viscous material from an outlet orifice of the dispenser. The electrically actuated jetting dispensers can, more specifically, use a piezoelectric actuator. Piezo stacks are very accurate and extremely fast reacting ceramic devices. A property of the piezo stack is that when a voltage is applied the ceramic material will perform a displacement in one direction. One main drawback is that the piezo stack produces a very small displacement. For example, a 7 mm×7 mm×36 mm long stack produces about 36 microns of movement. This displacement may not be great enough for proper jetting of fluids.

Space limitations and life expectancy are also considerations when designing an actuator that includes a piezo material. Life expectancy is severely shortened when the stack is placed in a tension condition. The piezo stack needs to be able to operate at a frequency of 1000 Hz continuous, and needs to apply sufficient force to reliably and accurately jet a small amount of fluid.

For at least these reasons, there is a need for improved dispensing systems to increase and regulate the piezoelectric actuation for dispensing fluids.

SUMMARY

The foregoing needs are met by the various embodiments of dispensing systems and amplifiers disclosed. In one aspect, a dispensing system for dispensing a fluid material includes a piezoelectric stack having a distal end and being configured to expand upon application of a voltage such that the distal end is moved by a first length. The dispensing system further includes an amplifier having a primary surface configured to contact the distal end of the piezoelectric stack and a secondary surface opposite the primary surface, a base configured to contact the secondary surface of the amplifier, and a valve assembly having an outlet orifice and valve element. The valve element is configured to move in a first direction and in a second direction opposite the first direction. The valve element is operatively coupled with the amplifier. When the distal end is moved by the first length, a portion of the amplifier is moved by a second length that is greater than the first length, and the valve element is moved in the first direction by the second length.

In another aspect, an amplifier for amplifying movement of a mechanical apparatus includes a body having a primary surface and a secondary surface opposite the primary surface and an interface on the body configured to operatively engage with a push rod. The body is configured to contact the mechanical apparatus at the primary surface. The body is further configured to deform in response to a force applied to the primary surface, such that the push rod is moved in a first direction.

In another aspect, a method of dispensing fluid using a piezoelectric stack and an amplifier operatively coupled to the piezoelectric unit includes applying a voltage to the piezoelectric stack to cause the piezoelectric stack to lengthen by a first distance. The amplifier is caused to deform and a portion thereof is moved a second distance greater than the first distance. The deformation of the amplifier causes movement of a movable shaft within a valve assembly and causes an amount of fluid to be dispensed from an outlet orifice in the valve assembly.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Disclosed are devices and methods for amplifying movement of a piezoelectric actuator. While the present disclosure provides examples of utilizing piezoelectric movement, it will be understood that the amplification devices and methods disclosed herein can be used for amplification of other types of mechanical movements as well, for example, pneumatic, hydraulic, elastic, or another suitable movement mechanism.

Figure 1:
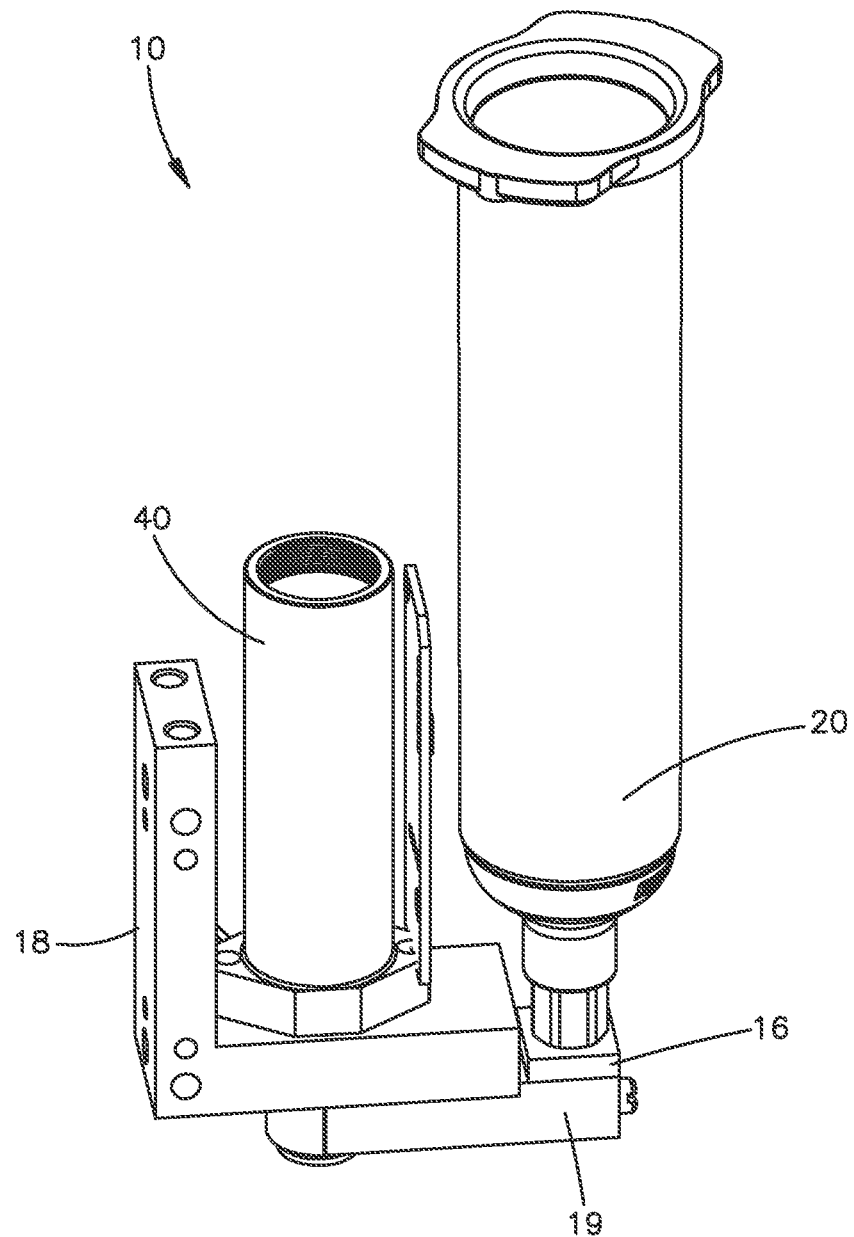
FIG. 1 illustrates an isometric view of a dispensing system according to an embodiment.
Figure 2:
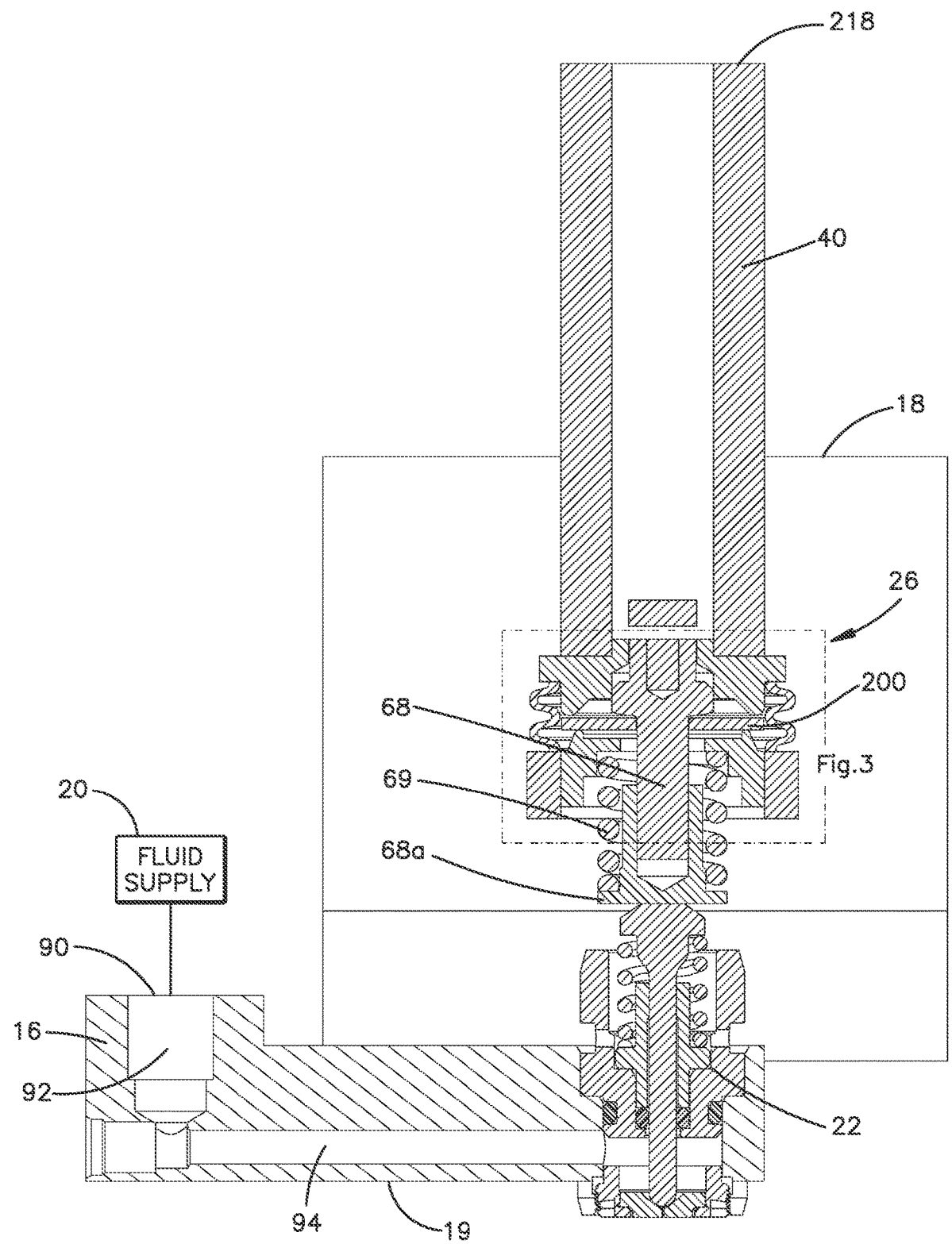
FIG. 2 illustrates a cross-sectional view of a portion of the dispensing system of FIG. 1.

Referring to FIGS. 1-2, a dispensing system 10 is shown having a fluid body 16 coupled to an actuator housing 18. The fluid body 16 is held within a fluid body housing 19, which may include one or more heaters (not shown), depending on the needs of the application. The fluid body 16 is configured to receive fluid under pressure from a suitable fluid supply 20, such as a syringe barrel. A valve assembly 22 is coupled to the housing 18 and extends into the fluid body 16. A mechanical amplifier 200 is coupled between a piezoelectric actuator 26 and the valve assembly 22, as will be described further below. The piezoelectric actuator 26 may be fastened to the housing 18 by a plurality of bolts (not shown) or another suitable fastener. The actuator may include various materials, for example, but not limited to, stainless steel or a nickel-iron alloy.

Figure 3:
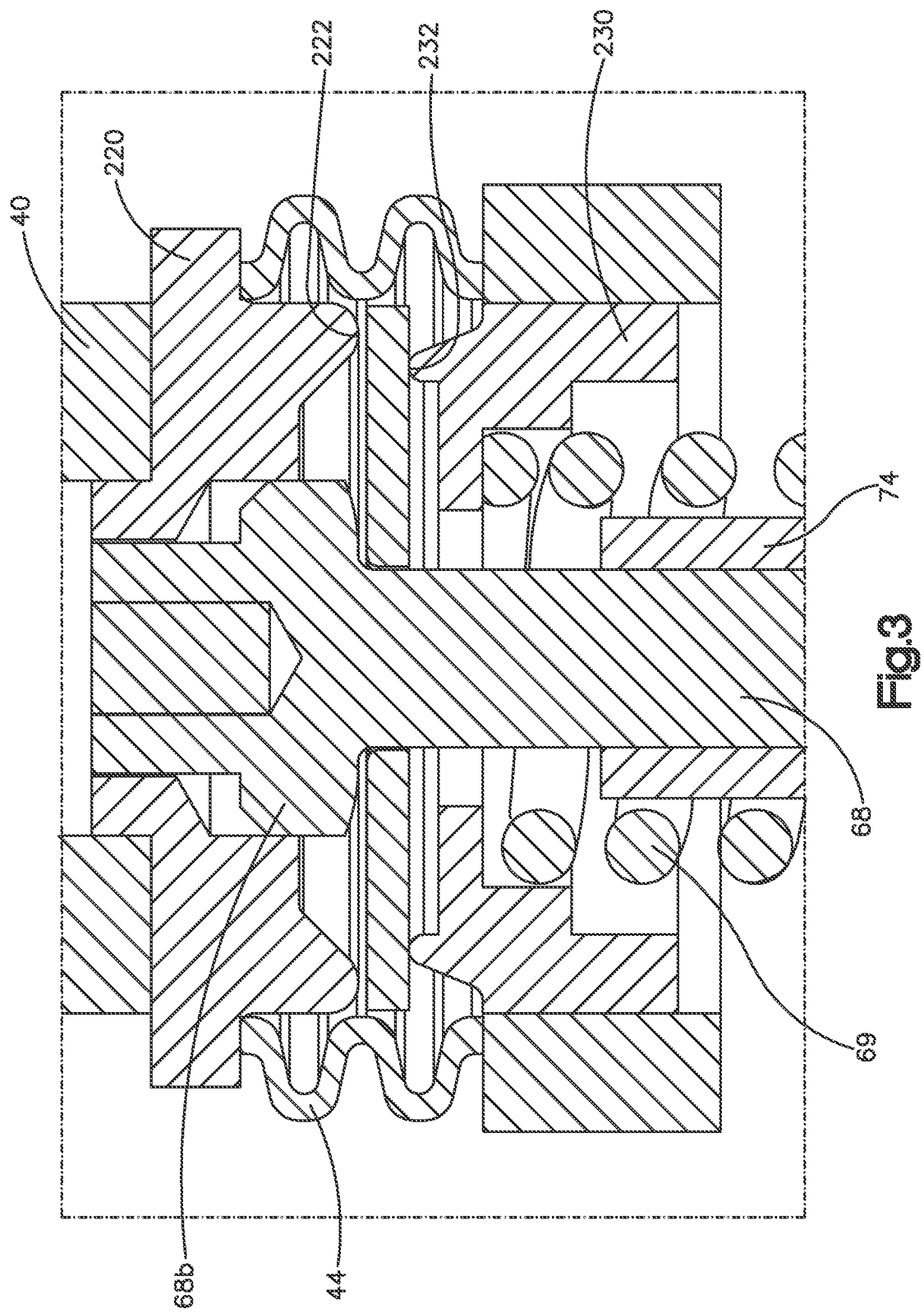
FIG. 3 illustrates a cross-sectional view of a portion of the dispensing system of FIGS. 1-2.

As further shown in FIGS. 2-3, the piezoelectric actuator 26 includes a stack 40 of piezoelectric elements, a proximal end 218, and a distal end 220 opposite the proximal end 218. The piezoelectric elements are configured to deform upon application and/or removal of a voltage. This stack 40 is maintained in compression by a compression spring 44 coupled to the piezoelectric actuator 26.

The stack 40 may be held in compression between the spring 44 at the distal end 220 and a rigid surface (not shown), for example, against an internal surface of the housing 18. The rigid surface may contact the proximal end 218. In some aspects, the stack 40 may be held by a plurality of spring 44, for example, a first spring at the proximal end 218 and a second spring 44 at the distal end 220.

Figure 4A:
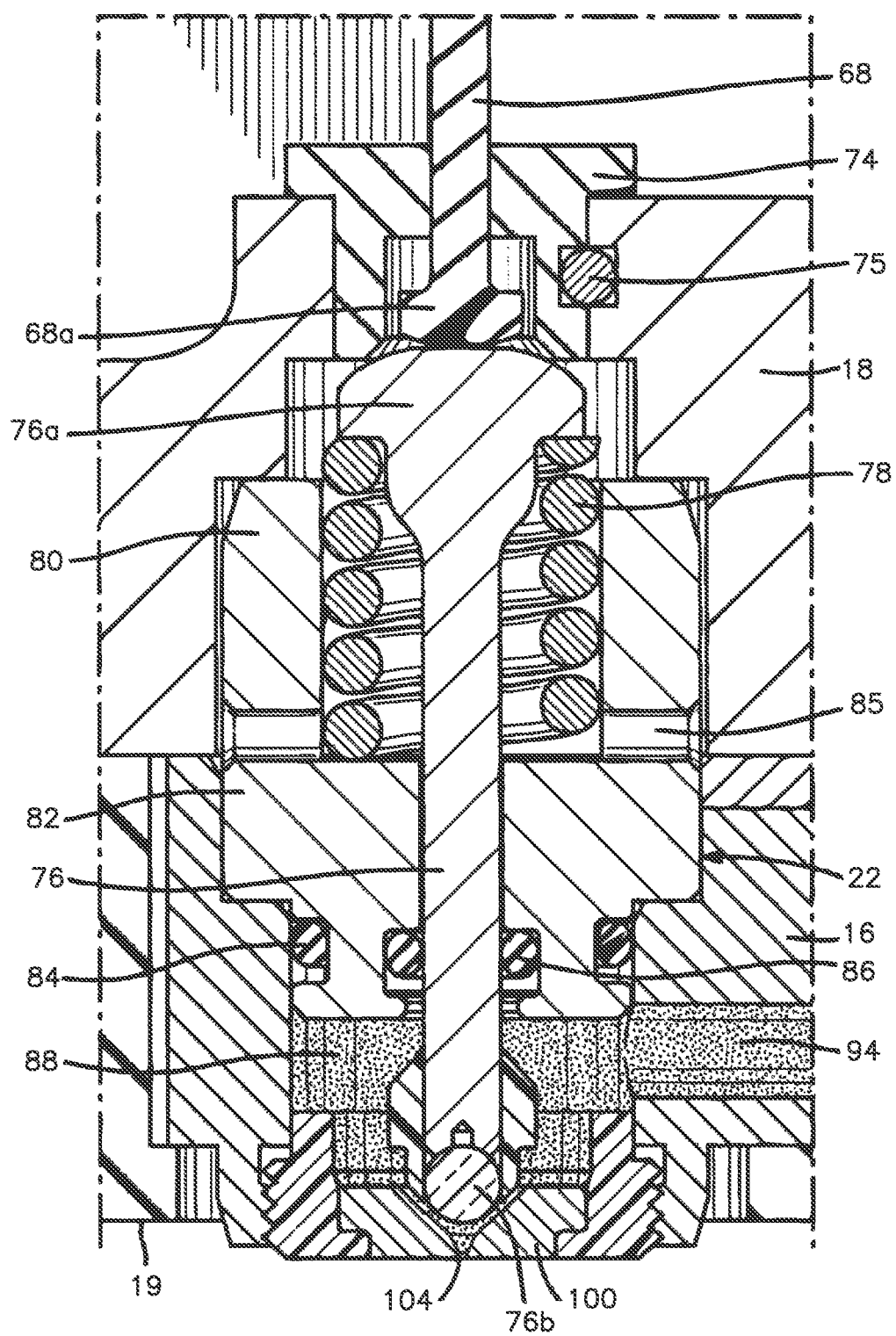
FIG. 4A illustrates a cross-sectional view of a valve assembly with a valve element in an open condition.
Figure 4B:
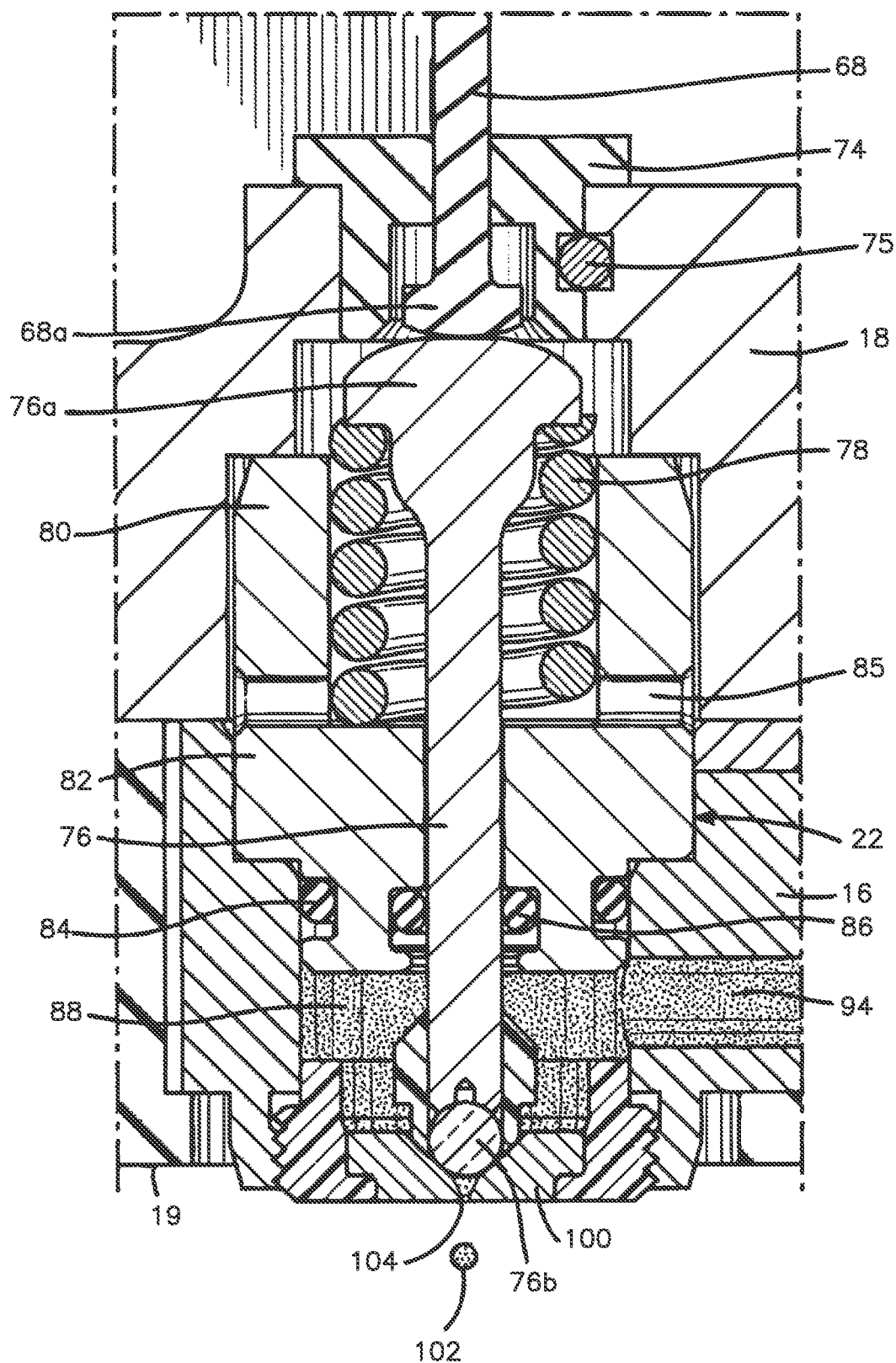
FIG. 4B illustrates a cross-sectional view of the valve assembly of FIG. 4A with the valve element in a closed position after jetting a droplet of fluid.

The piezoelectric actuator 26 is operatively engaged with a push rod 68 and is configured to move the push rod 68 in a first direction. Referring to FIGS. 4A-4B, the push rod 68 has a lower head portion 68a that travels within a guide bushings 74 and bears against a proximal end 76a of a valve element 76 associated with the valve assembly 22, wherein the valve element 76 may be a movable shaft. The guide bushing 74 may be held in the housing 18 by a pressfit with a pin 75. The assembly of the push rod 68, guide bushing 74 and pin 75 allows for some "give" to ensure proper movement of the push rod 68 during operation.

The valve assembly 22 may further comprise a coil spring 78 that is mounted within a lower portion of the housing 18 using an annular element 80. An insert 82 may be retained in the fluid body 16 by an O-ring 84. The annular element 80 and the insert 82 comprise an integral element, i.e., a cartridge body in the depicted aspect.

An additional O-ring 86 seals the valve element 76 such that pressurized fluid contained in a fluid bore 88 of the fluid body 16 does not leak out. Fluid is supplied to the fluid bore 88 from the fluid supply 20 through an inlet 90 of the fluid body 16 and passages 92, 94. The O-ring 84 seals the outside of the cartridge body formed by the annular element 80 and insert 82 from the pressurized liquid in fluid bore 88 and passage 94. A cross-drilled weep hole 85 is approximately in line with the lower end of the coil spring 78 to allow any liquid that leaks past the O-ring 86 to escape.

When voltage is applied to the stack 40, the piezoelectric elements deform, and the stack 40 expands or lengthens, causing the distal end 220 to move in a direction away from the proximal end 218 against the force exerted by the spring 44. The stack 40 may be configured to change length in proportion to the amount of voltage applied thereto. When the applied voltage is removed or sufficiently reduced, the stack 40 contracts or shortens to substantially the same length as it was before the application of the voltage.

The movement of the stack 40 causes movement of the push rod 68 operatively coupled to the piezoelectric actuator 26. The push rod 68 may be operatively coupled to a valve element 76 disposed on the valve assembly 22. As the push rod 68 is moved, the valve element 76 also moves to open or close a discharge outlet 104 on the valve assembly 22. Repeated movement of the stack 40 results in reciprocal movement of the valve element 76 and causes droplets or small amounts of fluid to be dispensed or jetted through the discharge outlet 104 of the dispensing system 10.

In some applications, the magnitude of the movement of the stack 40 is not sufficient to result in the desired movement of the valve element 76. In such aspects, it may be desirable to amplify the movement of the stack 40 to result in a proportionally greater magnitude of movement of the valve element 76.

Referring again to FIGS. 2-3, an amplifier 200 may be disposed within the dispensing system 10 to proportionally amplify the movement of the stack 40. The amplifier 200 is coupled to the stack 40 and to the valve assembly 22, such that movement of the stack 40 causes at least a portion of the amplifier 200 to move, which in turn causes the valve element 76 to move. When voltage is applied to the stack 40, movement of the stack 40 imparts a force onto the amplifier 200 and causes the amplifier to move as well and to move the valve element 76. It will be appreciated that if amplification of the original movement is desired, the magnitude of the movement of the valve element 76 by the amplifier 200 will be greater than the magnitude of the movement of the stack 40.

Figure 5:
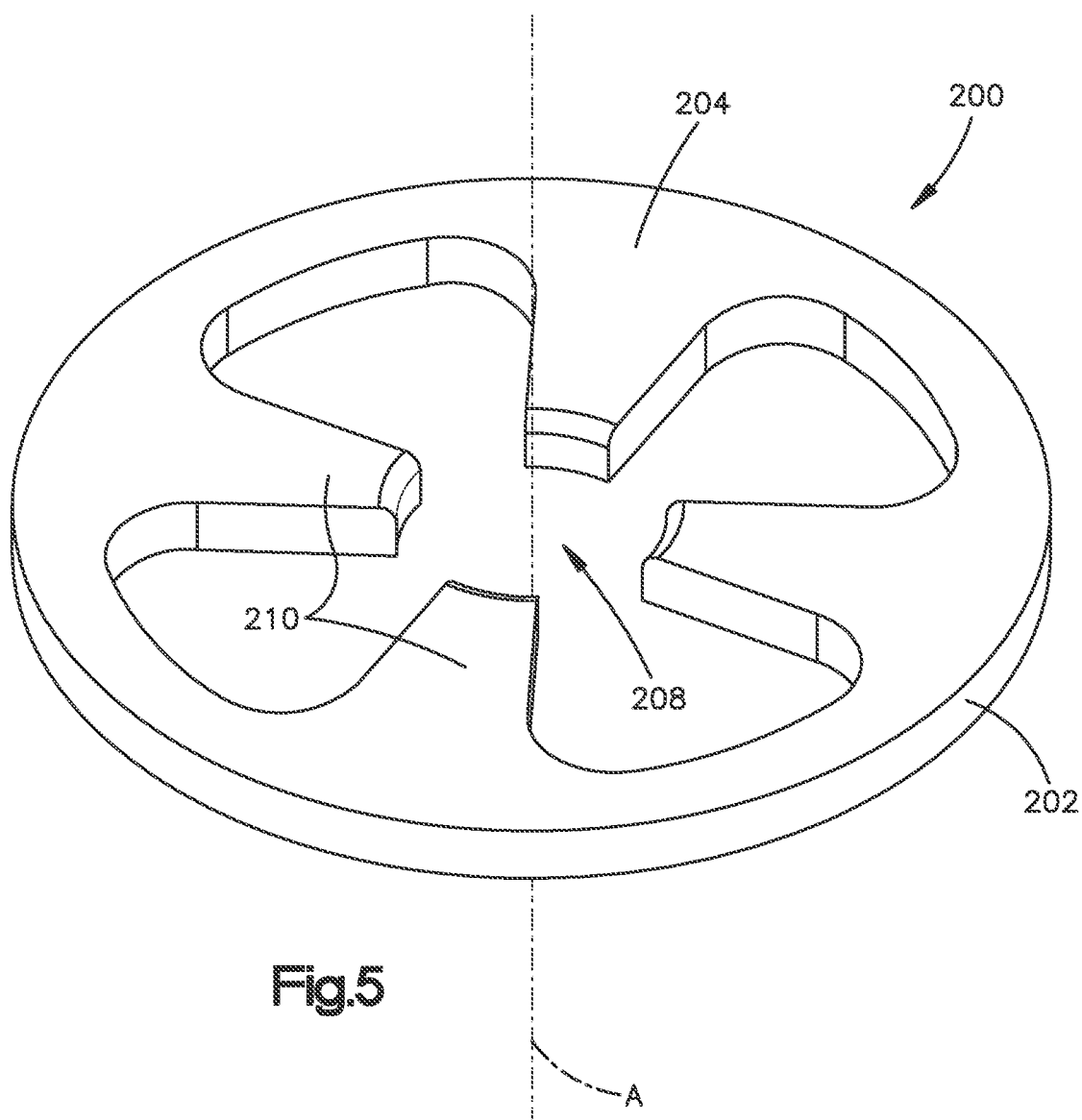
FIG. 5 illustrates an isometric view of an amplifier according to an embodiment.
Figure 6:
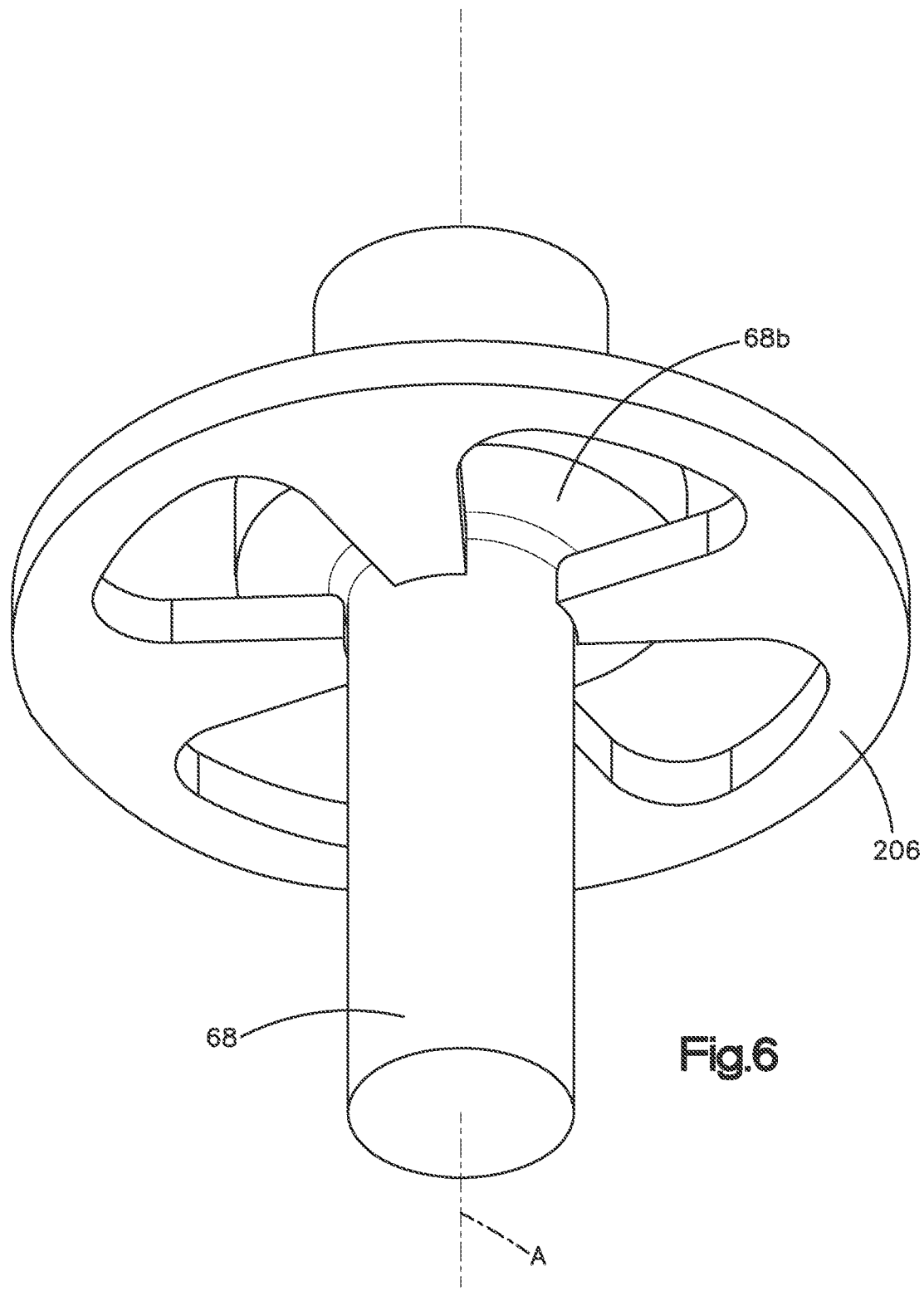
FIG. 6 illustrates a different isometric view of the amplifier of FIG. 5 engaged with a push rod.

Referring to FIGS. 5-6, the amplifier 200 may be a disc having a substantially round cross-section. However, it will be understood that the amplifier may be any suitable shape, for example having rectangular, triangular, or another polygonal cross-sectional shape.

The amplifier 200 may be integral with the dispensing system 10, being either part of a single unitary component, or a separate component affixed to the dispensing system 10. In some aspects, the amplifier 200 may be a separate component that is removably coupled to the dispensing system 10 and is configured to be selectively engaged with or disengaged from the stack 40 and the valve assembly 22. The dispensing system 10 may be configured to operate either with an amplifier engaged or without an amplifier engaged. In some aspects, the dispensing system 10 may include a plurality of amplifiers 200 that can be selectively engaged or disengaged to result in varying degrees of amplification. The dispensing system 10 may be configured to operate with multiple amplifiers 200 simultaneously engaged. In some aspects, an amplifier 200 may be interchangeable with another amplifier 200 to result in a different degree of amplification.

Referring still to FIGS. 5-6, the amplifier 200 includes a body 202, which has a primary surface 204 and a secondary surface 206 opposite the primary surface 204. The body 202 may comprise a deformable material that can be deformed upon application of force. The deformable material should be sufficiently resilient so that when the force that causes the deformation is reduced or removed, the body 202 returns substantially to its undeformed shape. The body 202 should be rigid enough to receive a force from the stack 40 and to impart a force onto the valve element 76 without sustaining damage (e.g., without cracking or breaking). It will be understood that no material is perfectly elastic and infinitely durable, and that a person skilled in the art would recognize materials that would perform the desired functions to an adequate degree.

The amplifier 200 may include an opening 208 extending through the body 202 and connecting the primary surface 204 with the secondary surface 206. A central axis A extends through the geometric center of the opening 208. The central axis A may also be common with the central axis of the stack 40 and the push rod 68. In some aspects, one or more lobes 210 may extend radially inward from a circumference of the body 202 into the opening 208 toward the central axis A. The lobes 210 may be substantially perpendicular to the central axis A when the amplifier 200 is not in a deformed configuration. The amplifier 200 may include 2, 3, . . . , 10, or another suitable number of lobes. Alternatively, the amplifier 200 may include zero lobes extending from the body 202 and be donut-shaped.

The amplifier 200 may be operatively coupled to the push rod 68, such that when the amplifier 200 is moved, the push rod 68 also moves. It will be understood that the push rod 68 can be coupled to the amplifier 200 in any suitable manner, for example, via friction fit, using an adhesive, or using a fastener. The push rod 68 may alternatively be integrally formed with the amplifier 200. Referring to the aspects depicted in FIG. 6, the push rod 68 may extend through the opening 208 of the amplifier body 202. In such aspects, at least a portion of the push rod 68 should be shaped and dimensioned such that it can freely pass through the opening 208. An upper head portion 68b of the push rod 68 may contact the amplifier 200, for example at the primary surface 204. The upper head portion 68b may be sized and dimensioned larger than the opening 208 such that it is prevented from passing through the opening 208. In some aspects, where the amplifier 200 is deformed, the opening 208 may be larger than it is when the amplifier 200 is un-deformed. In such aspects, the upper head portion 68b should be sized to be larger than the opening 208 of the deformed amplifier 200 as well.

The upper head portion 68b is integrally attached to the portion of the push rod 68 that is configured to pass through the opening 208. The amplifier 200 may impart a force onto the upper head portion 68b, which is, in turn, transferred to the rest of the push rod 68.

The amplifier 200 may operate as a lever mechanism to receive a force from the stack 40 and to impart a force onto the push rod 68. The amplifier 200 may be disposed between the distal end 220 of the piezoelectric actuator 26 and a base 230. Referring again to FIGS. 2-3, the primary surface 204 may be adjacent to the distal end 220, while the secondary surface 206 may be adjacent to the base 230.

In some aspects, to increase precision of the force transfer, the amplifier 200 is contacted by specific contact regions disposed on the distal end 220 and the base 230. As shown in FIG. 3, for example, a primary protrusion 222 may be disposed on the distal end 220 and extend therefrom in a direction toward the primary surface 204 of the amplifier 200. Similarly, the base 230 may include a secondary protrusion 232 that extends therefrom in a direction toward the secondary surface 206 of the amplifier 200. While the primary protrusion 222 and the secondary protrusion 232 may extend from the distal end 220 and the base 230, respectively, at any acceptable angle, it will be understood that at least a component of the angle of extension should be substantially perpendicular to the primary and secondary surfaces 204, 206, respectively.

In some alternative aspects, the primary protrusion 222 may be integral to and extend from the primary surface 204 of the amplifier body 202 toward the distal end 220. Similarly, the secondary protrusion 232 may be integral to and extend from the secondary surface 206 of the amplifier body 202 toward the base 230. In further aspects, protrusions may extend from one or more of the amplifier 200, the distal end 220, and/or the base 230, and this disclosure is not limited to a particular arrangement of protrusions as described above.

In operation of some aspects of this disclosure, the dispensing system 10 is configured to jet droplets or small amounts of fluid. When the stack 40 is activated, i.e., when voltage is applied to the piezoelectric elements by the main electronic control (not shown), the stack 40 expands and pushes against the amplifier 200 at the primary surface 204. Based on the position of the protrusions as described above, the amplifier 200 deforms and imparts a force onto the upper head portion 68b of the push rod 68. This forces the push rod 68 to move in an opening direction toward the piezoelectric actuator 26. The distance the upper head portion 68b is moved by the amplifier 200 is preferably greater than the distance moved by the distal end 220 of the stack 40. The lower head portion 68a, integral to the push rod 68, also moves in the same opening direction. As the lower head portion 68a moves away from the valve element 76, the valve element 76 is also permitted to move in the opening direction. The valve element 76 may be biased toward the opening direction by a coil spring 78, and when the push rod 68 moves away from the valve element 76, the coil spring 78 moves the valve element 76 in the opening direction as well.

When voltage is removed or sufficiently reduced from the stack 40, the movements described above are reversed. The stack 40 is reduced in length, thus decreasing the force applied to the amplifier 200. The amplifier 200 may then return to its substantially undeformed state, which in turn decreases the force applied onto the upper head portion 68b of the push rod 68. The push rod 68 may be biased by a coil spring 69 in a closing direction opposite the opening direction. As the force applied by the amplifier 200 onto the push rod 68 is reduced below the biasing force of the coil spring 69, the coil spring 69 moves the push rod 68 in the closing direction. The lower head portion 68a contacts the proximal end 76a of the valve element 76 and pushes the valve element 76 in the closing direction against the force of the coil spring 78 until a distal end 76b, disposed on the valve element 76 opposite the proximal end 76a, engages against a valve seat 100. The coil spring 78 may have a lower stiffness than the coil spring 69 such that, absent external forces, the force exerted by the coil spring 69 in the closing direction is greater than the force exerted by the coil spring 78 in the opening direction.

In the process of movement, the distal end 76b of the valve element 76 may force a droplet 102 of fluid from the discharge outlet 104 when the distal end 76b strikes the valve seat 100 of the discharge outlet 104.

It will be appreciated that the piezoelectric actuator 26 may be utilized in reverse to jet droplets. In this case, the various mechanical actuation structures may be designed differently such that when the voltage is applied to the stack 40, the resulting expansion of the stack 40 causes movement of the valve element 76 toward the valve seat 100 and causes the discharge outlet 104 to discharge a droplet 102 of fluid. Then, upon removal of the voltage to the stack 40, the amplification system and other actuation components would raise the valve element 76 in order to charge the fluid bore 88 with additional fluid for the next jetting operation. In such aspects, the valve element 76 would be normally open, i.e., not engaging the valve seat 100 when there is no voltage applied to the stack 40.

The amount of deformation of the amplifier 200 and, as a result, the degree of amplification of the movement of the stack 40 is determined, in part, by the relative positioning of the primary and secondary protrusions 222, 232 as they contact the primary and secondary surfaces 204, 206, respectively. When voltage is applied to the stack 40, the stack 40 lengthens and moves the distal end 220 to apply a force to the amplifier 200. The primary protrusion 222 at the distal end 220 may contact the primary surface 204 of the amplifier 200 at a first distance D1 away from the central axis A that extends through the geometric center of the amplifier 200. The base 230 is disposed on the other side of the amplifier 200 such that it is configured to contact the secondary surface 206. A secondary protrusion 232 may contact the secondary surface 206 at a second distance D2 away from the central axis A. To create a suitable lever action to amplify the distance moved by the distal end 220, the first distance D1 and the second distance D2 should be different.

Figure 7:
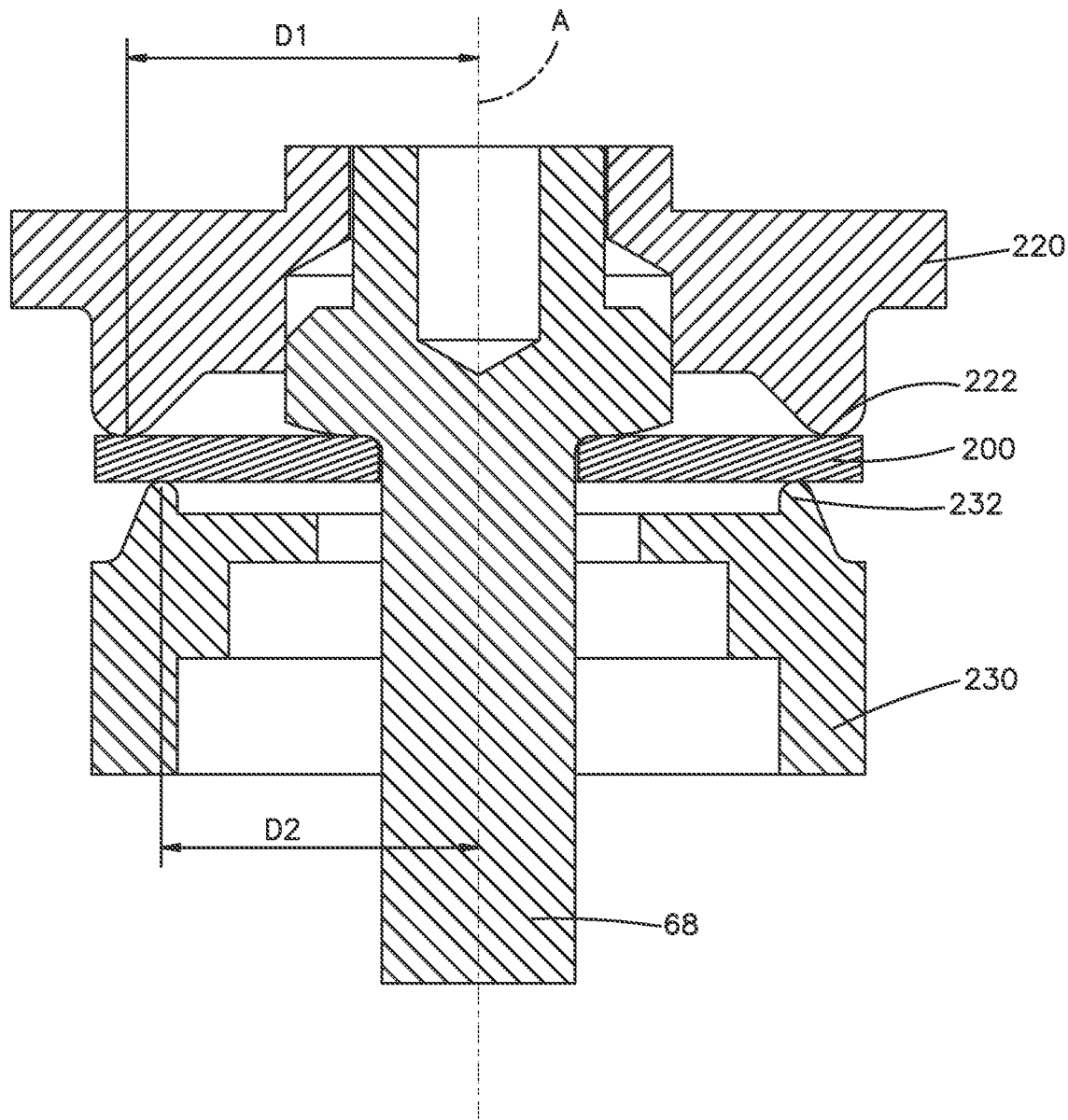
FIG. 7 illustrates a cross-sectional view of an amplifier within an actuator according to an embodiment with the amplifier in an un-deformed configuration.
Figure 8:
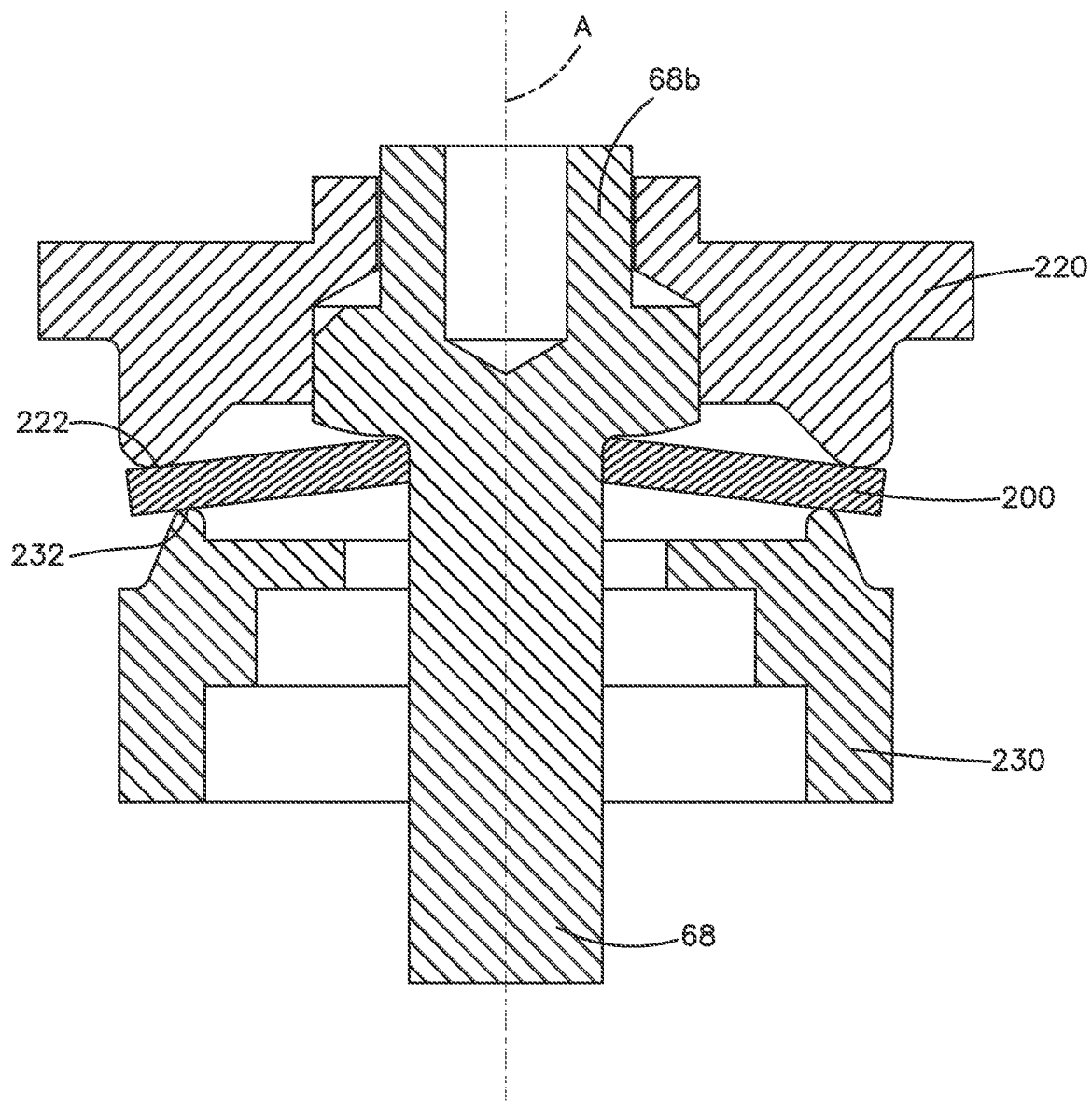
FIG. 8 illustrates a cross-sectional view of the amplifier of FIG. 7 in a deformed configuration.

Referring to FIGS. 7-8, the first distance D1 may be greater than the second distance D2. When force is applied to the primary surface 204 by the primary protrusion 222, the secondary protrusion 232 acts as a fulcrum. Thus, as a portion of the amplifier 200 that is farther from the central axis A than the second distance D2 is pushed in one direction (e.g., downward) by the primary protrusion 222, another portion of the amplifier 200 that is closer to the central axis A than the second distance D2 is levered in an opposite direction (e.g., upward). The push rod 68 that is operatively coupled with the amplifier, e.g., at the interaction of the primary surface 204 or the lobes 210 and the upper head portion 68b, is thus moved in the same direction. FIG. 8 depicts an exemplary aspect where the stack 40 is lengthened and a force is applied onto the primary surface 204 of the amplifier 200. The amplifier 200 is thus deformed, and the upper head portion 68b, along with the rest of the push rod 68, is moved axially along the central axis A.

Figure 9:
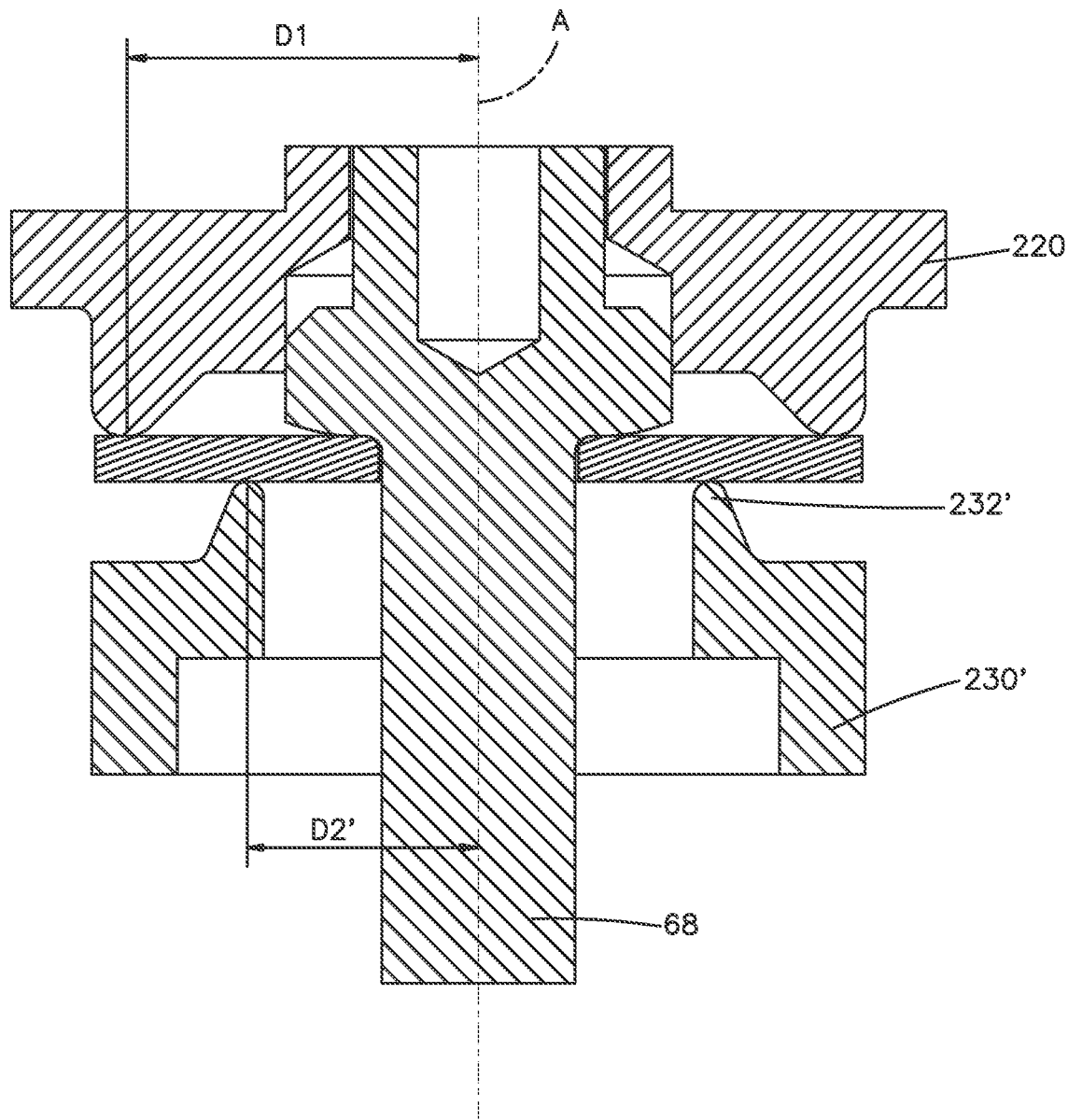
FIG. 9 illustrates a cross-sectional view of an amplifier within an actuator according to another embodiment.

The distance that the push rod 68 moves depends on the first and second distances D1, D2. As the second distance D2 increases (i.e., as the fulcrum gets farther from the central axis A), the distance that the push rod 68 moves will also increase. The amount of amplification may be controlled by increasing or decreasing the second distance D2. FIG. 9, for example, depicts an aspect having a base 230' having a secondary protrusion 232' that is disposed at a second distance D2' away from the central axis A. The second distance D2' is smaller than the second distance D2. As such, in an aspect having base 230', the push rod 68 will move a smaller distance than it would in an aspect utilizing the base 230, resulting in a smaller comparable amplification (taking all other factors as equal).

While changing the second distance D2 is a suitable method of adjusting the amount of amplification, amplification may be changed in a variety of ways. In some aspects, the amplifier 200 may include a material that is configured to deform more easily (e.g., softer or more elastic material) or a material configured to be more rigid (e.g., stiffer or less elastic material). The thickness of the body 202 may be increased (to increase rigidity) or decreased (to increase pliability). In some aspects, the lobes 210 may be changed in thickness, material properties, and/or length (i.e. distance the lobes extend from the body 202 to the central axis A).

The body 202 of the amplifier 200 may have a varying thickness (i.e., the distance between the primary surface 204 and the secondary surface 206) therethrough. In some aspects, for example, the body 202 may be at a maximum thickness farthest away from the opening 208 and at a minimal thickness closest to the opening 208, with the thickness gradually decreasing from the maximum to the minimum thickness. Alternatively, the body 202 may include one or more steps (not shown), each step having a different thickness, where, for example, the step farthest from the opening 208 is at the maximum thickness and the step closest to the opening 208 is at the minimum thickness.

The concepts described throughout this disclosure offer a number of advantages over existing technology. While other mechanical actuators exist that do not utilize piezoelectric elements, those designs are limited by more moving parts, slower response time, and lower long-term durability. Piezoelectric actuators, on the other hand, allow for significantly faster actuation than, for example, hydraulic or air operated devices.

The devices and methods related to amplification of the actuated movement disclosed herein improve the reliability of the jetting systems and increase cost-effectiveness. Existing technology requires forming an amplifier with exceptionally precise specifications and with difficult-to-use expensive machinery, such as milling machines and electrical discharge machining (EDM) apparatuses. The precise requirements of the existing amplifiers requires products to be prepared with very tight tolerances, which require a high level of skill to produce, take longer to manufacture, and necessitate acquiring, maintaining, and/or allocating use of complex machinery. Furthermore, existing amplifiers are less durable than those described throughout this application, requiring more frequent repair or replacement, which results in higher expenses, decreased production volumes, and more revenue lost to machine and personnel downtime.

The amplifiers described herein can be manufactured using inexpensive materials and faster and cheaper machinery. The designs disclosed in this application allow for looser tolerances during machining, which speeds up the process and increases throughput. Additionally, increased tolerances mean that fewer components will be deemed unusable for failing to meet the exceptionally stringent requirements. This would reduce waste and cost of materials. The present amplification methods and devices further offer increased durability and lifespan. In some aspects, a single amplifier may be configured to function for up to 10 million, up to 100 million, up to 500 million, or up to 1 billion actuations. Some designs may operate without failure for over 1 billion actuations.

The amplifiers disclosed herein further allow for simpler replacement and/or interchangeability to increase or decrease the amount of amplification. This allows for using the same dispensing systems to dispense different types and/or different amounts of fluids. In some aspects, the amplification may be adjusted depending on the thickness of the fluid to be dispensed. For example, more amplification (and thus a larger opening within the valve assembly) may be desirable for dispensing highly viscous fluid, while less amplification may be desirable for dispensing a low-viscosity fluid. In some aspects, the amplification adjustment may be accomplished by replacing a first amplifier 200 with a second amplifier 200 having different parameters. Alternatively (or additionally), other components of the dispensing system may be interchangeable to increase or decrease amplification as well, such as the base 230.

While systems and methods have been described in connection with the various aspects of the various figures, it will be appreciated by those skilled in the art that changes could be made to the aspects without departing from the broad inventive concept thereof. It is understood, therefore, that this disclosure is not limited to the particular aspects disclosed, and it is intended to cover modifications within the spirit and scope of the present disclosure as defined by the claims.

What is claimed is:

1. A dispensing system for dispensing a fluid, the dispensing system comprising:
   a piezoelectric stack having a distal end, the piezoelectric stack being configured to expand upon application of a voltage such that the distal end is moved by a first length;
   an amplifier having a primary surface configured to contact the distal end of the piezoelectric stack and a secondary surface opposite the primary surface, the amplifier having a first portion and a second portion and defining an opening extending from the primary surface to the secondary surface;
   a base configured to contact the secondary surface of the amplifier; and
   a valve assembly including an outlet orifice and a valve element configured to move in a first direction and in a second direction opposite the first direction, the valve element being operatively coupled with the amplifier,
   wherein when the distal end of the piezoelectric stack is moved by the first length, a portion of the amplifier is moved by a second length that is greater than the first length, and the valve element is moved in a first direction by the second length,
   wherein the amplifier is configured to transition to a deformed state in response to contact by the base on the secondary surface of the amplifier and by contact of the distal end of the piezoelectric stack on the primary surface of the amplifier, and based on the deforming of the amplifier, the first portion is configured to move in a direction toward the distal end and the second portion is configured to move in a direction away from the distal end such that the first portion is closer to the distal end than the second portion, and
   wherein the opening is configured to transition from a first size in an undeformed state to a second size, larger than the first size, in the deformed state.

2. The dispensing system of claim 1, wherein the piezoelectric stack has a proximal end, and the piezoelectric stack is oriented along an axis between the proximal end and the distal end.

3. The dispensing system of claim 2, wherein the amplifier is oriented along the axis between the primary surface and the secondary surface.

4. The dispensing system of claim 3, wherein the valve element is configured to move in the first direction and in the second direction along the axis.

5. The dispensing system of claim 1, wherein the amplifier is disposed between the piezoelectric stack and the base.

6. The dispensing system of claim 1, wherein the valve assembly further includes a valve seat, and movement of the valve element in the first direction is configured to jet an amount of fluid through the outlet orifice of the valve assembly when the valve element strikes the valve seat.

7. The dispensing system of claim 1, further comprising a spring positioned adjacent to the piezoelectric stack, wherein the spring is coupled to the piezoelectric stack such that the piezoelectric stack is maintained under constant compression.

8. The dispensing system of claim 1, wherein the distal end of the piezoelectric stack includes a primary protrusion extending therefrom, at least a portion of the primary protrusion extending toward the primary surface of the amplifier, and
   wherein the base includes a secondary protrusion extending therefrom, at least a portion of the secondary protrusion extending toward the secondary surface of the amplifier.

9. The dispensing system of claim 8, wherein the primary protrusion is a first distance away from a center of the amplifier, and the secondary protrusion is a second distance away from the center of the amplifier, the first distance being greater than the second distance.

10. The dispensing system of claim 9, further comprising a push rod operatively coupled to the amplifier and the valve element, wherein when the amplifier is moved the second distance, the push rod is also moved the second distance.

11. The dispensing system of claim 1, wherein the amplifier comprises a lobe configured to deform in the direction toward the distal end in response to the amplifier being in contact with the base on the secondary surface of the amplifier and with contact of the distal end of the piezoelectric stack on the primary surface of the amplifier.

12. The dispensing system of claim 1, wherein the second portion surrounds the first portion.

13. An amplifier for amplifying movement of a mechanical apparatus, the amplifier comprising:
   a body having a primary surface and a secondary surface opposite the primary surface, the primary surface configured to contact a primary protrusion extending from the mechanical apparatus; and
   an interface on the body configured to operatively engage with a push rod,
   wherein the body is configured to transition to a deformed state in response to a force applied to the primary surface of the body such that the push rod is moved in a first direction,
   wherein the body is configured to transition to an undeformed state when the force is removed from the primary surface, such that the push rod is moved in a second direction opposite the first direction, and
   wherein the interface defines an opening extending through the body and configured to receive the push rod, the opening having a first size in an undeformed state when the force is not applied to the body and a second size, larger than the first size, in the deformed state.

14. The amplifier of claim 13, further comprising a secondary protrusion on the secondary surface, the secondary protrusion being configured to contact a base,
   wherein the body is configured to receive the force on the primary surface at a first distance from the interface, the secondary protrusion is at a second distance from the interface, and the first distance is greater than the second distance.

15. The amplifier of claim 14, wherein the second size is smaller than an upper head portion of the push rod.

16. The amplifier of claim 13, wherein a thickness of the body between the primary surface and the secondary surface is constant.

17. The amplifier of claim 13, wherein a thickness of the body between the primary surface and the secondary surface is at a maximum thickness at a farthest point on the body from the interface and at a minimum thickness at a closest point on the body from the interface, the thickness of the body decreasing as a gradient from the farthest point to the closest point.

18. The amplifier of claim 13, wherein the mechanical apparatus includes a piezoelectric stack having a plurality of piezoelectric elements, and the force applied to the primary surface is exerted by the piezoelectric elements in response to a voltage applied to the piezoelectric stack, the primary surface of the amplifier is configured to contact a primary protrusion extending from the piezoelectric stack.

19. The amplifier of claim 13, wherein the body comprises one or more lobes extending therefrom.

20. A method of dispensing fluid using a dispensing system, the dispensing system including a piezoelectric stack having a distal end, an amplifier having a primary surface configured to contact the distal end and a secondary surface opposite the primary surface and defining an opening extending from the primary surface to the secondary surface, and a valve assembly including an outlet orifice and a valve element, the method comprising:
   applying a voltage to the piezoelectric stack to cause the piezoelectric stack to lengthen by a first distance;
   causing, in response to the lengthening of the piezoelectric stack by the first distance, the amplifier to transition to a deformed state and a portion thereof to move a second distance greater than the first distance; and
   causing, in response to movement of the portion of the amplifier by the second distance, the valve element to move in a first direction by the second distance to dispense an amount of fluid from the outlet orifice,
   wherein the amplifier is configured to transition to the deformed state in response to contact on the secondary surface and contact by the distal end of the piezoelectric stack, and based on the deforming of the amplifier, a first portion of the amplifier is configured to move in a direction toward the distal end and a second portion of the amplifier is configured to move in a direction away from the distal end such that the first portion is closer to the distal end than the second portion, and
   wherein the opening is configured to transition from a first size in an undeformed state to a second size, larger than the first size, in the deformed state.

21. The method of claim 20, further comprising removing the applied voltage to cause the piezoelectric stack to shorten by the first distance and cause the amplifier to transition to the undeformed state.

22. The method of claim 21, wherein the dispensing system further comprises a spring configured to bias the valve element away from the outlet orifice, such that removal of the applied voltage causes the valve element to move in a second direction opposite the first direction.

23. The method of claim 22, further comprising applying the voltage to the piezoelectric stack to cause the valve element to again move in the first direction by the second distance to dispense an amount of fluid from the outlet orifice.

* * * * *